United States Patent
Matlin et al.

(10) Patent No.: US 8,763,550 B1
(45) Date of Patent: *Jul. 1, 2014

(54) TECHNOLOGIES FOR AIDING LINE HANDLING

(71) Applicants: Gerald Matlin, Stamford, CT (US); Vincent Grasso, Beford Hills, NY (US)

(72) Inventors: Gerald Matlin, Stamford, CT (US); Vincent Grasso, Beford Hills, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/031,197

(22) Filed: Sep. 19, 2013

Related U.S. Application Data

(63) Continuation-in-part of application No. 13/337,455, filed on Dec. 27, 2011, now Pat. No. 8,567,334.

(51) Int. Cl.
*B63B 21/00* (2006.01)
(52) U.S. Cl.
USPC .............. 114/230.2; 114/230.25; 114/230.1
(58) Field of Classification Search
USPC ............ 114/230.2, 230.25, 230.26, 230.15, 114/218, 230.1, 230.11
See application file for complete search history.

(56) References Cited

U.S. PATENT DOCUMENTS

| | | | |
|---|---|---|---|
| 3,120,831 A | 2/1964 | Fulton | |
| 3,330,244 A | 7/1967 | Page | |
| 4,073,255 A | 2/1978 | Paul | |
| 5,036,787 A | 8/1991 | Rogers | |
| 5,154,132 A | 10/1992 | Brushaber | |
| 5,513,592 A | 5/1996 | Cotton | |
| 5,520,134 A | 5/1996 | Walker | |
| 5,662,306 A * | 9/1997 | Dysarz | 248/514 |
| 7,789,033 B2 | 9/2010 | Doig et al. | |

FOREIGN PATENT DOCUMENTS

GB    2226998 A  *  7/1990  .............. B63B 21/00

* cited by examiner

*Primary Examiner* — Edwin Swinehart
(74) *Attorney, Agent, or Firm* — Goldstein Law Offices, P.C.

(57) ABSTRACT

A plurality of technologies for aiding line handling are disclosed. The technologies enable a marine vessel occupant to use a line, which has a fixed end secured to a dock and a free end extending over a body of water, for docking.

19 Claims, 18 Drawing Sheets

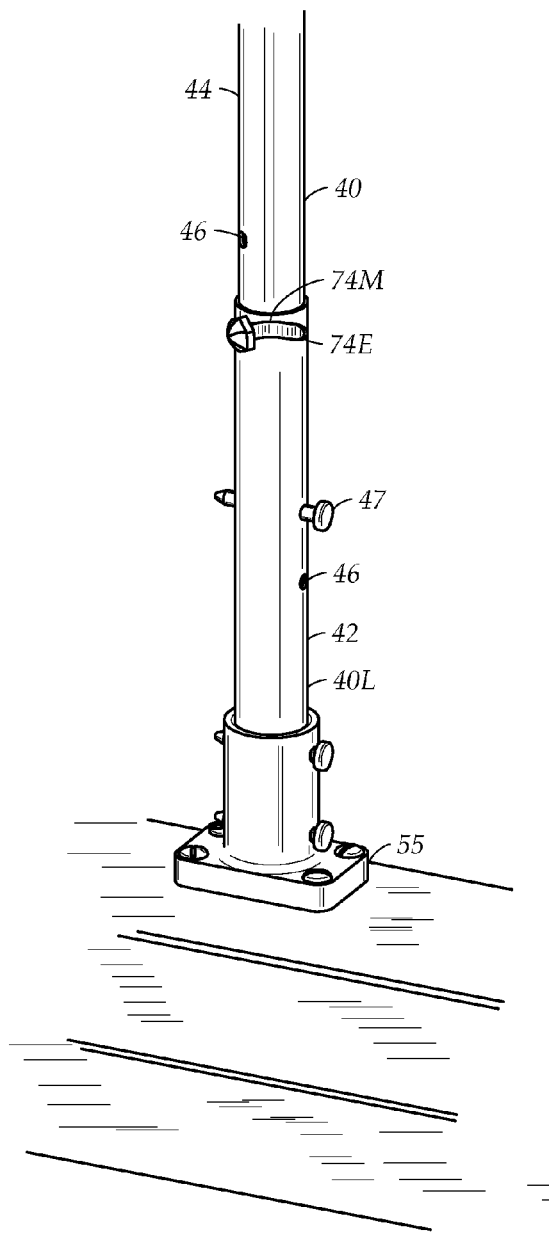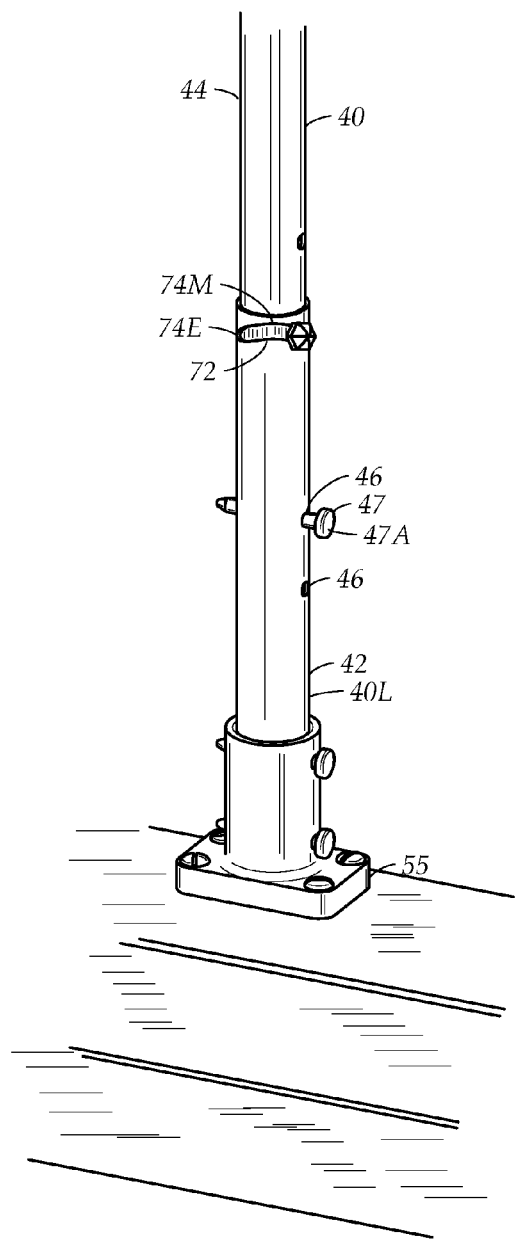
FIG. 5A
FIG. 5B

TECHNOLOGIES FOR AIDING LINE HANDLING

CROSS-REFERENCE TO RELATED APPLICATIONS

The present application is a continuation-in-part (CIP) of U.S. patent application Ser. No. 13/337,455, filed on Dec. 27, 2011, which is fully incorporated by reference herein for all purposes.

TECHNICAL FIELD

Generally, the present disclosure relates to marine vessel technologies. More particularly, the present disclosure relates to line handling technologies.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure may be concerned with.

A marine vessel, such as a boat, a yacht, a ship, and so forth, is operative for movement within a body of water. Such movement is often via self-propulsion, for instance via a propeller, a sail, a turbine, and so forth, as directed via an occupant of the vessel. However, when not propulsive, then the vessel moves within the body of water based on ambient water conditions and/or wind conditions unless the vessel is secured to a point having a relatively fixed position. One example of such point is a dock cleat on a dock.

The vessel is typically secured to the point via a line, such as a rope, extending between the point and a vessel cleat on the vessel. However, when the vessel unsecured to the point via the line, then the line remains coupled to either to the point or the vessel cleat. Therefore, when the vessel should be secured to the point, then the occupant either retrieves the line associated with the point for securing to the vessel cleat or retrieves the line associated with the vessel cleat for securing to the point.

Securing the vessel to the point can be complicated, tedious and time consuming, especially in a confined space. For example, for safety and property damage avoidance, the vessel is typically operated slowly and carefully such that the vessel is limited in its directional movement. Further, when the ambient water conditions and/or wind conditions become turbulent, then securing the vessel to the point becomes even more complex.

Although line handling can sometimes be made simpler via presence of another person, whether internal or external to the vessel, who can throw the line from the point to the vessel or from the vessel to the point, other limitations exist. For example, the line can be large, bulky, and/or heavy, which can cause injury if the person slips and/or falls into the body of water. Moreover, the line can sometimes be of such weight that even a strong person may only be able to throw the line a few feet. In addition, under windy conditions, throwing the line is even more burdensome. Also, whenever the line is exposed to marine air, then the line's structural integrity may be compromised, thus reducing safety, and/or the line may retain water, thus adding to the weight. Further, when the line is stored on the vessel, then the occupant often carries the line from one area of the vessel to another. However, on larger vessels, especially with flying bridges and/or having reduced exterior space for walking around the vessel, if there are no storage lockers available, then such carrying can be dangerous under stormy conditions. Moreover, the person may be inexperienced and/or mentally and/or physically unfit for such line throwing. Additionally, even if the person is mentally and physically fit, the person is often mandated to jump off the vessel to grab the line and/or carry and secure the line, while manually preventing the vessel from unsafe movement and/or causing property damage, which further exposes the person to falling into the body of water and/or getting injured, especially during vessel movement in the confined space. Furthermore, stormy weather can complicate line handling, especially when the person and the occupant are unable to communicate with each other clearly and/or a deck of the vessel or the dock are slippery, such as during snow and/or rain. Moreover, the person is not always available for such assistance, especially when the occupant desires to be unescorted and/or present at an unfamiliar and/or remote dock. Therefore, the occupant is often alone to not only pilot the vessel, but also for securing the vessel to the dock, while avoiding the vessel striking the dock without falling overboard and/or suffering a personal injury. Resultantly, such limitations can be a deterrence from using the vessel and/or a detriment to enjoying the vessel when using the vessel, at least for recreational purposes.

Similarly, casting off can also become difficult for the occupant to perform safely alone. Typically, in order to cast off alone, the occupant unties the line from the dock cleat and then quickly jumps onto the vessel to gain control of the vessel. Failure to do so can result in the vessel quickly drifting out of reach and/or out of control, thus exposing an owner of the vessel to potential vessel loss and/or legal liability for any damages resulting from uncontrolled vessel operation.

While certain aspects of conventional technologies have been discussed to facilitate the present disclosure, no technical aspects are disclaimed. The claims may encompass at least one of the conventional technical aspects discussed herein.

BRIEF SUMMARY

The present disclosure may at least partially address at least one of the above. However, the present disclosure may at least partially prove useful in addressing other problems and/or deficiencies in a number of technical areas. Therefore, the claims should not be construed as necessarily limited to addressing any of the above.

According to an example embodiment of the present disclosure a marine vessel docking system is disclosed. The system is for use with a marine vessel in a body of water, a dock adjacent to the body of water, and a line having a fixed end and a free end. The vessel having an occupant onboard. The dock including a cleat having a first horn and a second horn extending oppositely from each other. The fixed end is secured to the dock. The system including a cleat clamp configured for manual clamping to the cleat. The system also including a mast having a lower end and an upper end. The lower end is configured for coupling to the clamp. The system further including an arm having a proximal end, a distal end, and a lower side extending between the proximal end and the distal end. The proximal end is configured for coupling to the upper end such that the arm is capable of extending at least substantially perpendicularly therefrom. The system additionally including a plurality of clips coupled to the side along the side. The clips are configured for selectively holding the line such that the line extends between the proximal end and the distal end along the side and the free end is near the distal end. The clips are configured for facilitating the line to be grasped by the occupant such that the clips release the line therefrom to the occupant when the vessel is near the arm and the arm extends over the body of water.

According to another example embodiment of the present disclosure a marine vessel docking system is disclosed. The system is for use with a marine vessel in a body of water, a dock adjacent to the body of water, and a line having a fixed end and a free end. The vessel having an occupant onboard. The dock having a dock surface with a cleat equipped with a pair of feet coupled to the dock surface. The cleat having a main body with a first horn and a second horn extending from the main body oppositely from each other outwardly of the feet. The fixed end is secured to the dock. The system including a base having a base block. The block having a front face, a rear face, and a bottom surface. The block having a pair of wedges extending from the rear face near the bottom surface. The wedges having a space therebetween such that the wedges can extend snugly beneath the first horn and the second horn with the feet extending between the wedges. The system also including a strap having a pair of strap ends. The strap is configured for extending around the front face of the block. The system further including an arm coupled to the block such that the arm can extend outwardly over the body of water for holding the free end in a position where the free end can be reached by the occupant before the vessel reaches the dock when the block is secured to the cleat. The arm having a proximal end and a distal end. The system additionally including a line loop holder stationed on the arm between the proximal end and the distal end. The holder is configured for holding a loop when the free end includes the loop. The holder is positioned such that the loop avoids falling freely off the holder when the holder holds the loop.

According to yet another example embodiment of the present disclosure a marine vessel docking system is disclosed. The system is for use with a marine vessel in a body of water, a dock adjacent to the body of water, and a line having a fixed end and a free end. The vessel having an occupant onboard. The dock including a cleat having a first horn and a second horn extending oppositely from each other. The fixed end is secured to the dock. The system including a cleat clamp having a U-shaped body, a first U-fastener, and a second U-fastener. The body is defined via a base and a pair of walls extending from the base. The base having a first end and a second end opposing the first end. The second end is E-shaped. The first fastener is configured for fastening to the base near the first end while grasping the first horn. The second fastener is configured for entering the second end and fastening thereto while grasping the second horn. The walls are configured for extending along the cleat such that the cleat is between the walls while being between the base and the dock. The system also including a mast having a lower end and an upper end. The lower end is configured for coupling to the base such that the base is between the lower end and the cleat. The system further including an arm having a proximal end, a distal end, and a lower side extending between the proximal end and the distal end. The proximal end is configured for coupling to the upper end such that the arm is capable of extending at least substantially perpendicularly therefrom. The system additionally including a peg stationed on the arm between the proximal end and the distal end. The peg is configured for holding a loop when the free end includes the loop. The peg is positioned such that the loop avoids falling freely off the peg when the peg holds the loop.

To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

FIGS. 5A and 5B show a perspective of an example embodiment of a boat-docking device in alternate pivotal positions according to the present disclosure.

DETAILED DESCRIPTION OF THE PREFERRED EMBODIMENTS

Figure 1:
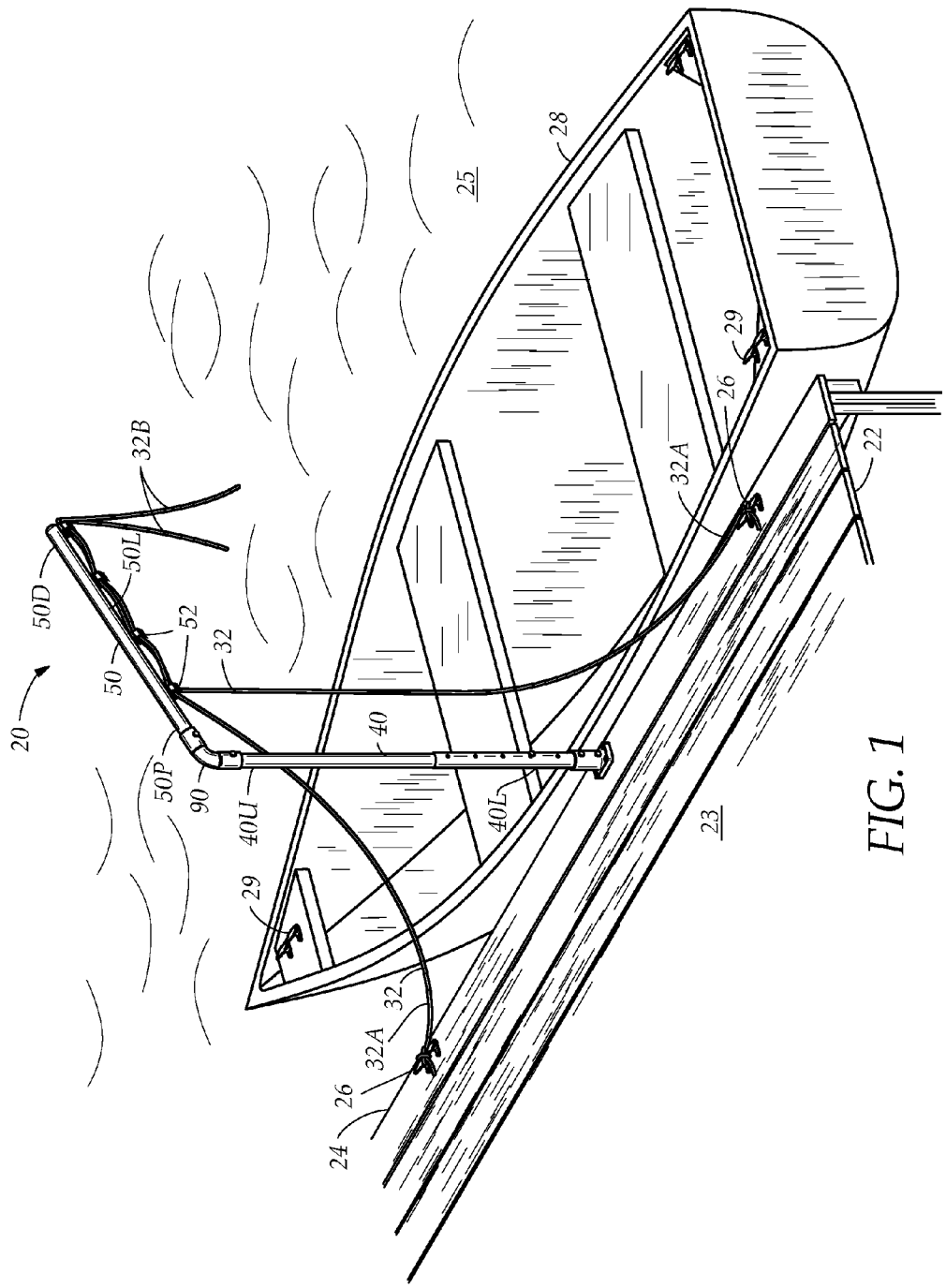
FIG. 1 shows a perspective view of an example embodiment of a boat-docking device handling a pair of lines according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the relevant art. In addition, features described with respect to certain example embodiments may be combined in and/or with various other example embodiments. Different aspects and/or elements of example embodiments, as disclosed herein, may be combined in a similar manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography, and so forth.

Any and/or all elements, as disclosed herein, can include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, reflection, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible and/or any other combinations thereof. Any and/or all elements, as disclosed herein, can be identical and/or different from each other in material, shape, size, internal space, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

According to an example embodiment of the present disclosure, a technology is disclosed. The technology enables aiding a boater in a docking operation by facilitating the boater in retrieving a line secured to a dock, as the boater approaches the dock. Accordingly, such technology may include a device configured to hold the line in a position where the line may be easily grabbed by an occupant of the boat.

According to an example embodiment of the present disclosure, a technology is disclosed. The technology enables holding a line at a convenient height above a water surface and a convenient distance from a dock. Accordingly, such technology may include an arm, which holds a free end of the line at such appropriate position.

According to an example embodiment of the present disclosure, a technology is disclosed. The technology enables an arm configured to hold selectively a line in space over a water surface, adjacent to a dock, while avoiding interference with a vessel when secured to the dock, especially for use with the vessel having a portion, which projects significantly above its water line. Accordingly, such technology may include an arm configured to swing selectively between an extended position perpendicular to the dock, and a retracted position parallel to the dock.

According to an example embodiment of the present disclosure, a technology is disclosed. The technology enables an arm to be configured such that the arm can be easily brought into an extended position, as a boat leaves a dock. Accordingly, such technology may include the arm having an extension adaptation at its distal end. The adaption allows an occupant of the boat to pull the arm into the extended position.

According to an example embodiment of the present disclosure, a technology is disclosed. The technology enables an arm, which can be positioned to be within an arm's length of an occupant for a variety of different sized vessels and people. Accordingly, such technology may include the arm constructed to be easily user-adjustable in height.

According to an example embodiment of the present disclosure, a technology is disclosed. The technology enables an arm configured to remain in position until repositioned by a user. The arm can effectively resist changing positions due to wind influence. Accordingly, such technology may include the arm configured to lock in perpendicular and extended positions.

According to an example embodiment of the present disclosure, a technology is disclosed. The technology enables a device, which can be secured easily and firmly to a dock without requiring a permanent installation and without damaging the dock. Accordingly, such technology may include the device configured or adapted to attach to standard cleats, which already exist on a surface of the dock.

According to an example embodiment of the present disclosure, a technology is disclosed. The technology includes a boat-docking device, for use with a boat, a dock adjacent to a body of water, and a plurality of dock lines. Each of the lines has a fixed end secured to the dock, and a free end. The docking device has a mast that is secured to the dock, and an arm that is secured to the mast and is configured to pivot selectively between an extended position substantially perpendicular to the dock, and a retracted position parallel substantially to the dock. The arm has a lower surface having a plurality of clips for holding the dock lines as the dock lines extend substantially parallel to the arm along the lower surface with the free end of dock lines available at the distal end so when the arm is extended perpendicular to the dock and over the body of water, then a boater can grab the free end before the boat reaches the dock.

FIG. 1 shows a perspective view of an example embodiment of a boat-docking device handling a pair of lines according to the present disclosure. A boat-docking device 20 is secured to a dock 22 having a dock surface 23 and a dock edge 24. A plurality of dock cleats 26 is fastened to dock 22, near dock edge 24. Dock edge 24 is adjacent to a body of water 25, such as a river, a sea, an ocean, a lake, a canal, and so forth. A boat 28 is buoyant upon body of water 25, has a plurality of boat cleats 29, and is positioned adjacent to dock edge 24. A plurality of dock lines 32 is available for securing boat 28. Each dock line 32 has a fixed end 32A, which is secured to one of dock cleats 26, and a free end 32B.

Boat docking device 20 includes a mast 40, and an arm 50. Mast 40 and arm 50 may be coupled or joined by any suitable means, such as via an elbow 90, at an angle that is substantially perpendicular or obtuse. Note though in other example embodiments such angle can be any angle, such as any angle between about 0 degrees and about 90 degrees with respect to mast 40, any angle between about 90 degrees and about 180 degrees with respect to mast 40, and so forth. Also, note that in other example embodiments, arm 50 can be movable via an application of manual force and/or powered force, such as via a motor. Further, note that in some example embodiments, at least one of mast 40 and arm 50 can be equipped with a light source for nighttime/fog visibility. The light source receives power from a battery coupled to or positioned within at least one of mast 40 and arm 50. The battery received energy from a solar cell coupled to at least one of mast 40 and arm 50. Also, in addition to or alternatively, the energy can come from another renewable energy source, such as a wind or water turbine, coupled to at least one of dock 22, mast 40 and arm 50.

Mast 40 has a lower end 40L, which is secured to dock 22, and an upper end 40U that is secured to arm 50. Arm 50 has a proximal end 50P, and a distal end 50D. Arm 50 has a lower side, including a lower surface 50L, and a clip arrangement, which includes a plurality of clips 52 positioned on lower surface 50L and spaced between proximal end 50P and distal end 50D along lower surface 50L. Note that clips 52 includes at least two clips 52. At least one of clips 52 can face body of water 25, whether directly or indirectly, such as in an angled or inclined manner. At least one of mast 40 and arm 50 can be hollow or solid. Also, note that at least one of mast 40 and arm 50 can include a lightning rod or lightning conductor. Further, note that in some example embodiments, mast 40 can extend vertically past arm 50 and/or mast 40 and arm 50 can couple or join to each other at any points along their lengths.

Figure 6:
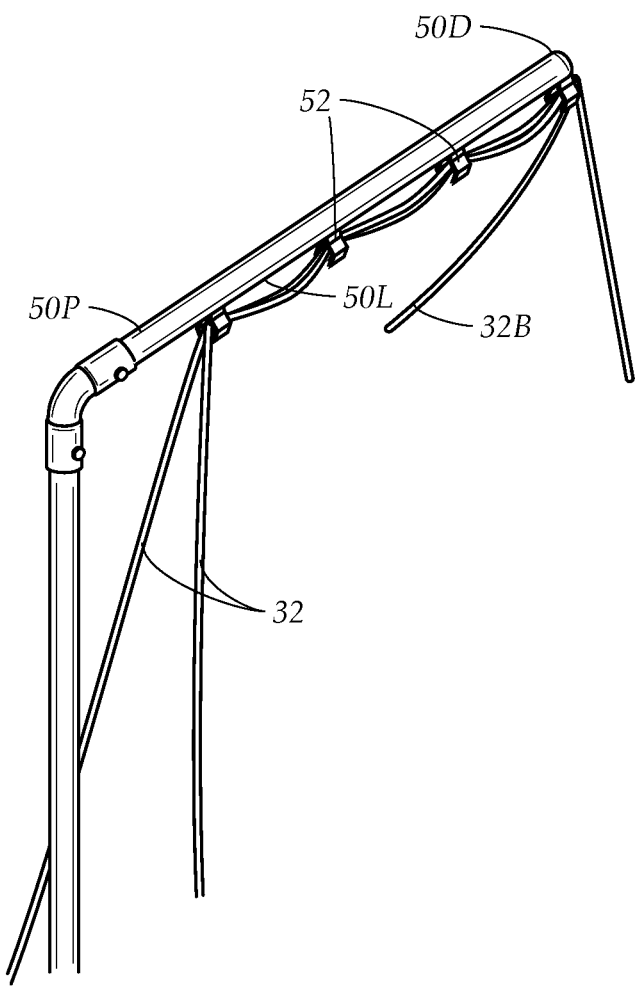
FIG. 6 shows a perspective view of an example embodiment an arm of a boat-docking device having a clip arrangement according to the present disclosure.
Figure 7:
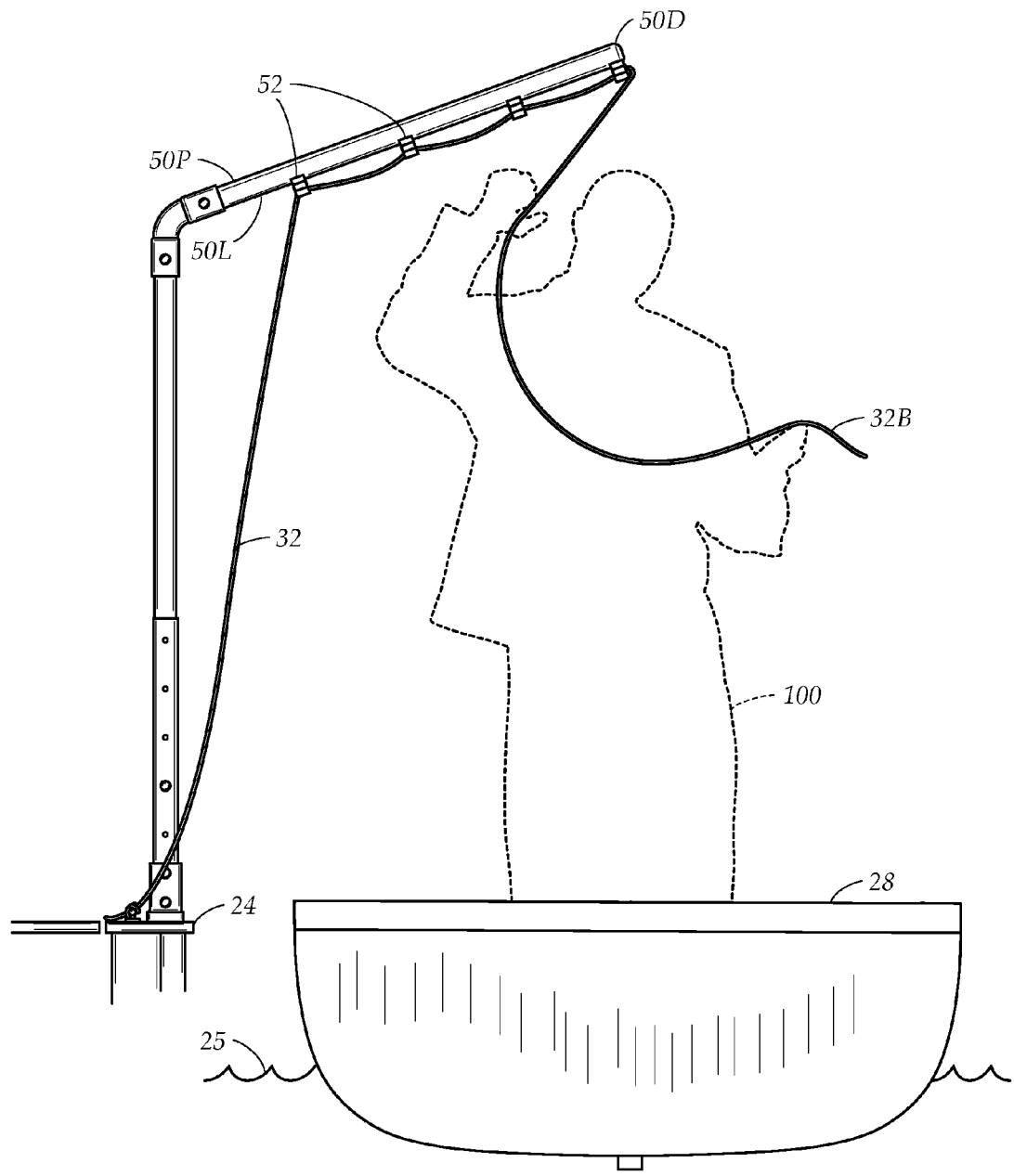
FIG. 7 shows a side view of an example embodiment of a boat-docking device holding a pair of lines according to the present disclosure.

Referring simultaneously to FIGS. 1, 6, and 7, dock lines 32 extend along lower surface 50L of arm 50. Dock lines 32 are held in place by clips 52 such that free end 32B of each of dock lines 32 dangles from and is available to be grasped at distal end 50D of arm 50. Clips 52 can be spaced apart from each other along surface 50L such that line 32 can be quickly grabbed in between clips 52 by a boater 100. Clips 52 can be positioned along surface 50L in an aligned manner, a misaligned manner, a linear manner, a wavy manner, an equidistant manner, a non-equidistant manner, and so forth.

As boat 28 approaches dock 22, with arm 50 extending beyond dock edge 24 and over water 25, boater 100 is able to grasp free end 32B of dock lines 32 before boat 28 even reaches dock 22. Boater 100 can be any occupant person onboard of boat 28, such as a pilot, a deck hand, a sailor, a staff member, a guest, a passenger, a boat owner, and so forth. Note that for example, arm 50 can extend any distance between about 3 feet and about 10 feet beyond dock edge 24 and over water 25. However, also note that arm 50 can also extend less than about 3 feet or greater than about 10 feet.

Figure 8:
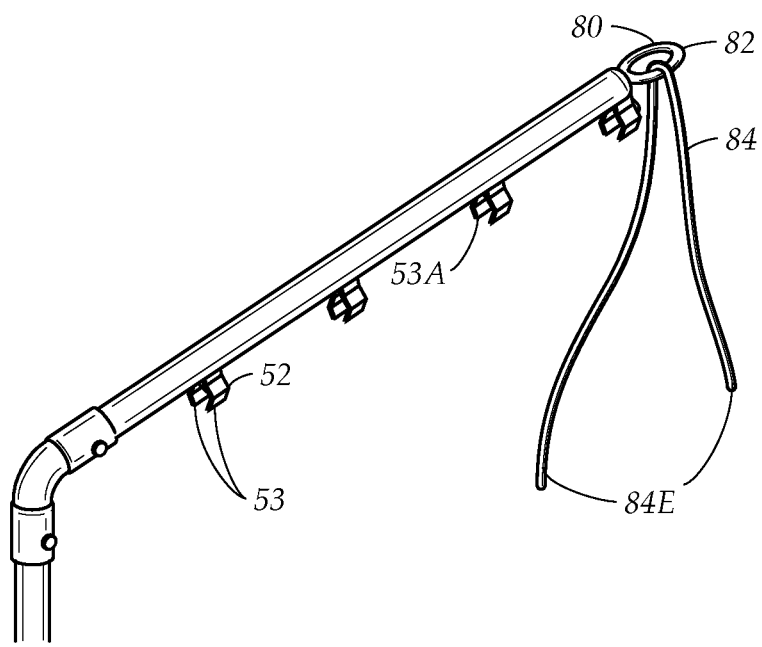
FIG. 8 shows a side view of an example embodiment of an extension adaptation on an arm of a boat-docking device according to the present disclosure.

Referring now to FIGS. 6 and 8, each of clips 52 has a pair of jaws 53, which defines a downward facing opening 53A that may be selectively enlarged and reduced in size. Jaws 53 are configured to exert a spring force that biases jaws 53 closed. Such spring force is tuned so that the downward facing opening will remain sufficiently closed to hold dock lines 32, yet open sufficiently to release dock lines 32 in response to a gentle, but deliberate force. In addition, in another example embodiment, at least one of clips 52 can be a claw. Further, clips 52 can be coupled to arm 50 in various ways, such via surface 50L, an internal surface of arm 50, an opening within arm 50, and so forth. Such coupling can be via fastening, adhering, magnetically attracting, mating, locking, nailing, and so forth.

Figure 2:
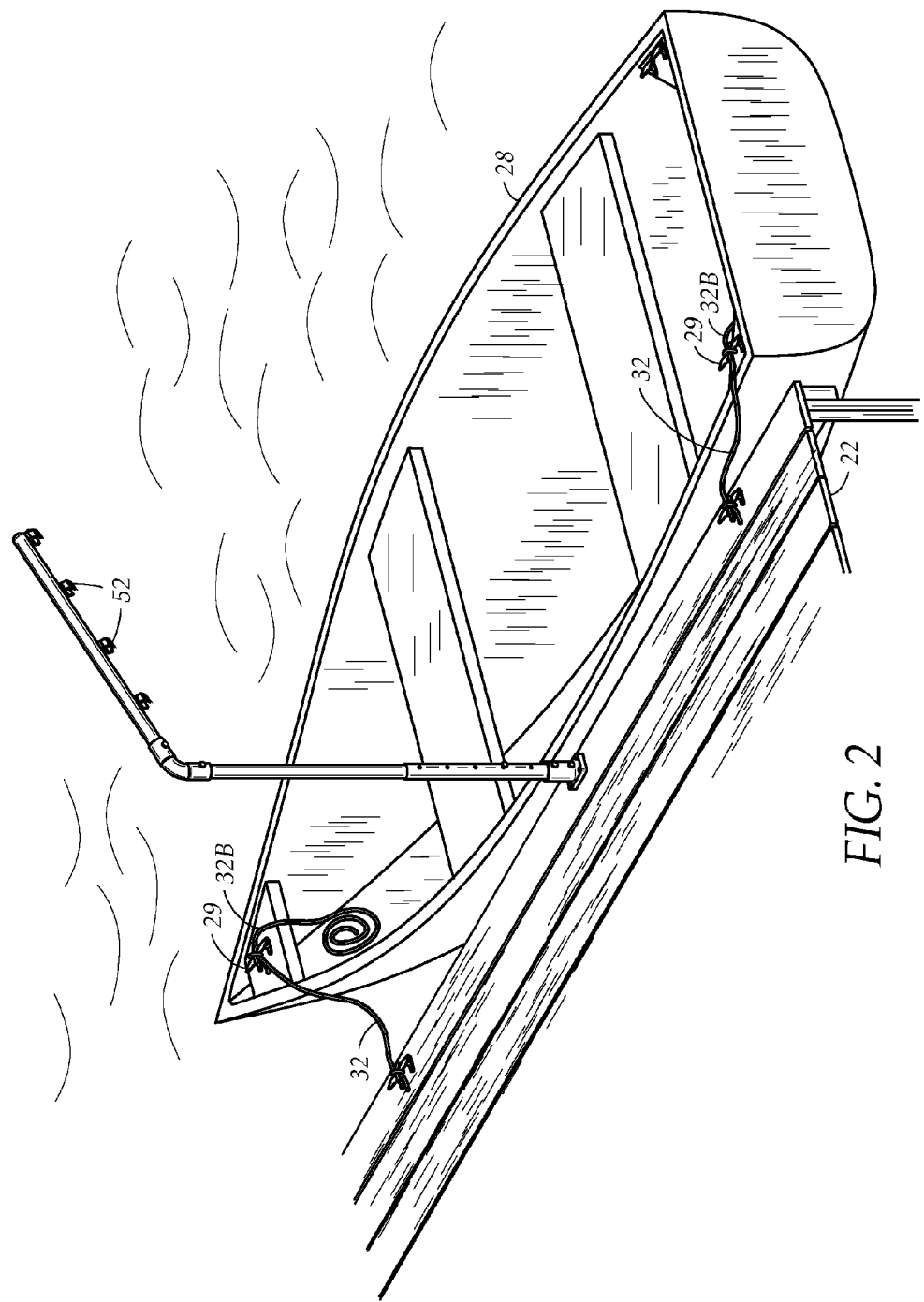
FIG. 2 shows a perspective view of an example embodiment of a boat-docking device not handling a pair of lines according to the present disclosure.

FIG. 2 shows a perspective view of an example embodiment of a boat-docking device not handling a pair of lines according to the present disclosure. Some elements of this figure are described above. Thus, same and/or similar reference characters identify identical and/or like components described above and any repetitive detailed description thereof will hereinafter be omitted or simplified in order to avoid complication.

Clips 52 have released dock lines 32 such that dock lines 32 are then used to secure boat 28 to dock 22 by securing free end 32B of each of dock lines 32 to each of boat cleats 29. Note boat 28, dock 22, cleats 26, cleats 29, and how dock lines 32 secure to boat 28 and/or dock 22 are illustrated for clarity and simplicity, and should not be construed as necessarily limiting the present disclosure. Other types of boat 28, dock 22, cleats 26, cleats 29 are possible as well. Further, various methodologies of how dock lines 32 secure to boat 28 and/or dock 22 are possible as well.

Figure 3:
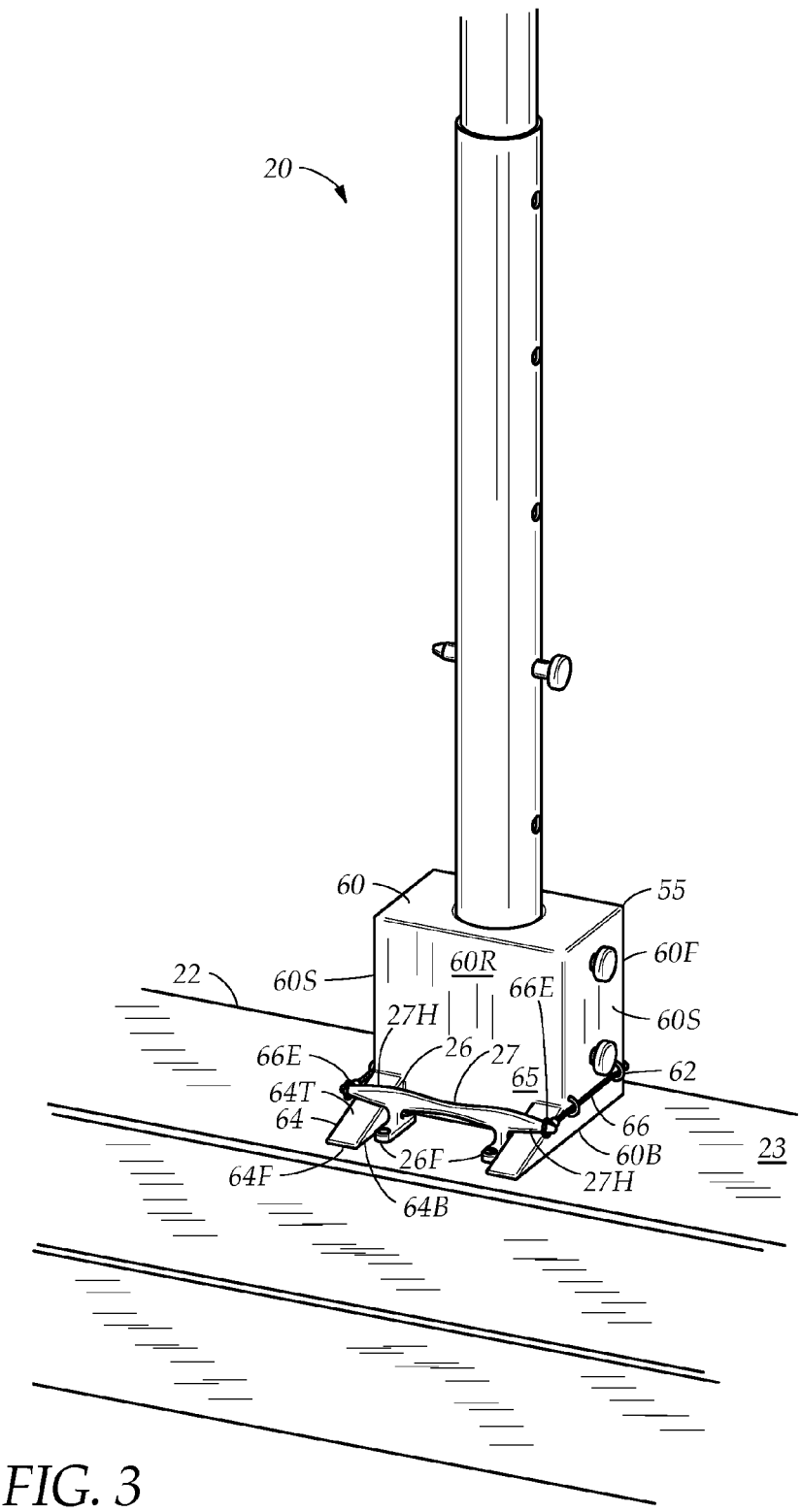
FIG. 3 shows a perspective view of an example embodiment a boat-docking device coupled to a dock cleat according to the present disclosure.

FIG. 3 shows a perspective view of an example embodiment a boat-docking device coupled to a dock cleat according to the present disclosure. Some elements of this figure are described above. Thus, same and/or similar reference characters identify identical and/or like components described above and any repetitive detailed description thereof will hereinafter be omitted or simplified in order to avoid complication.

Dock cleat 26 has a pair of feet 26F, which is secured directly to dock 22. Dock cleat 26 has a main body 27, which extends between feet 26F, suspended a short distance above dock 22 thereby. Feet 26F are spaced at a distance, which may be referred to as a 'feet spread'. Main body 27 includes a pair of horns 27H, which jut outwardly, beyond feet 26F, in opposite directions.

A base 55 includes a base block 60 and a strap 66. Base block 60 has a front face 60F, a rear face 60R, a bottom surface 60B, and a pair of side faces 60S. Each of side faces 60S has a pair of strap guides 62 at substantially same height above bottom surface 60B. Note that a pair of strap guides, whether identical to or different from guides 62, may also be located on front face 60F.

Base block 60 has a pair of wedges 64 that extend from rear face 60R adjacent to bottom surface 60B, and have a space 65 between wedges 64, which is at least as long as the feet spread of dock cleats 26. Each of wedges 64 has a top surface 64T, a bottom surface 64B, and a forward edge 64F that is fully opposite from base block 60. Bottom surface 64B of wedge 64 extends parallel substantially to bottom surface 60B of base block 60. Top surface 64T of wedge 64 tapers downwardly toward bottom surface 64B, as top surface 64T extends outwardly from rear face 60R of block 60 toward forward edge 64F.

In order to secure boat-docking device 20 to dock cleat 26, base block 60 is positioned immediately adjacent to one of dock cleats 26. Wedges 64 are extended beneath horns 27H until top surface 64T of each of wedges 64 rests snugly against one of horns 27H, and bottom surface 64B rests snugly against dock surface 23.

With base block 60 effectively wedged in place beneath dock cleat 26, further security is provided by strap 66, which extends around base block 60 and secured to horns 27H. Strap 66 has a pair of strap ends 66E. One of strap ends 66E is secured to one of horns 27H, strap 66 is extended through strap guides 62 along one of side faces 60S of base block 60, around front face 60F of base block 60 (and through strap guides on front face 60F if present thereon), through strap guides 62 along other of side faces 60S, and other of strap ends 66E attaches onto other horn 27H. Strap guides 62 provide for an effective connection between block 60 and strap 66 so that strap 66 cannot slip off base block 60. Note that strap 66 may have loops on its ends 66E as illustrated, may also be a wire that is pulled tight and then wrapped around each horn 27H to provide a tensioned connection, or any other suitable configuration or material to accomplish the connection, as desired, between base block 60 and dock cleat 26. Note that while the example provided illustrates front face 60F and side faces 60S as discrete surfaces, in some example embodiments, front face 60F and side faces 60S may be combined as one contiguous curved surface that spans opposite rear face 60R.

Figure 4:
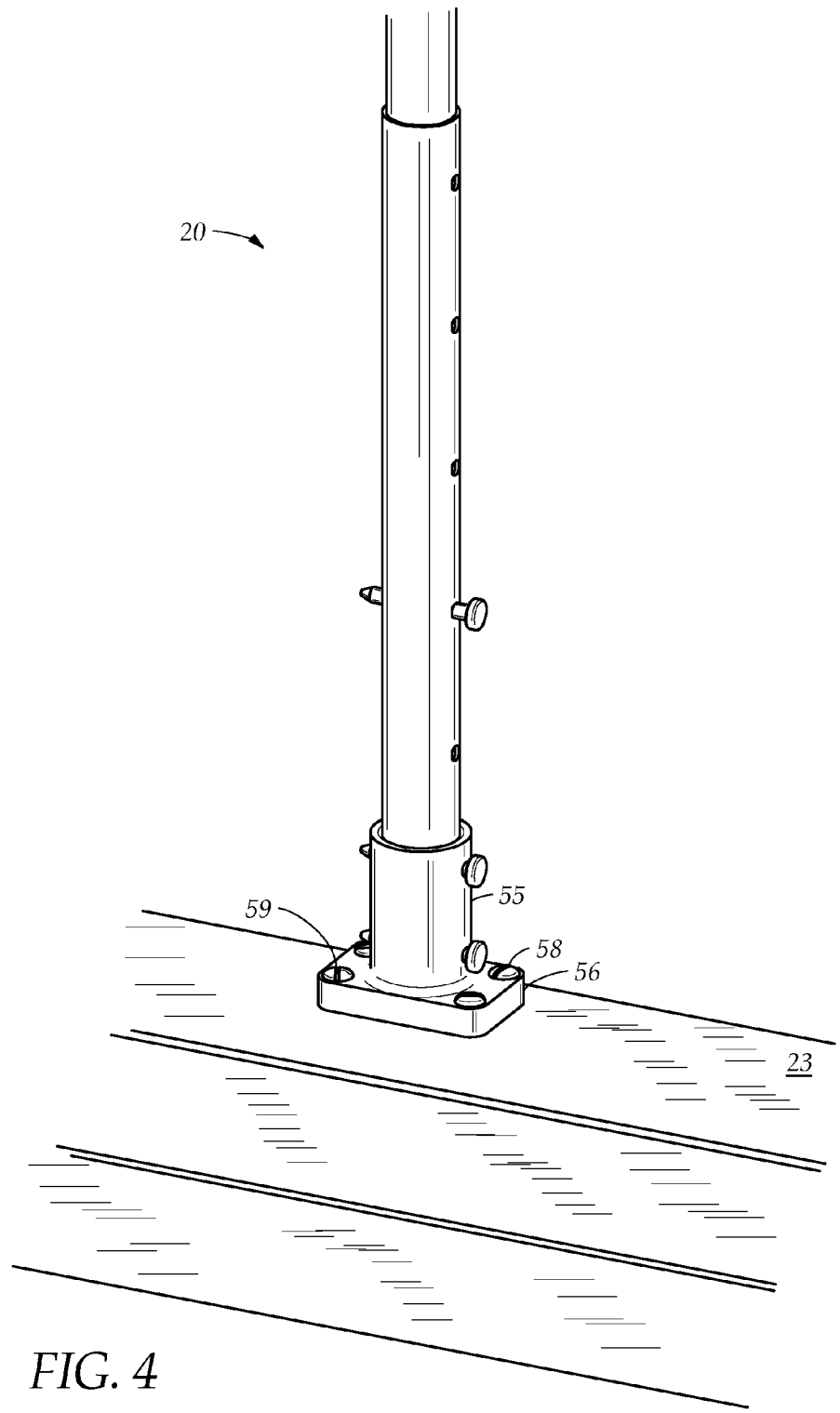
FIG. 4 shows a perspective view of an example embodiment of a boat-docking device coupled to a dock according to the present disclosure.

FIG. 4 shows a perspective view of an example embodiment of a boat-docking device coupled to a dock according to the present disclosure. Some elements of this figure are described above. Thus, same and/or similar reference characters identify identical and/or like components described above and any repetitive detailed description thereof will hereinafter be omitted or simplified in order to avoid complication.

Docking device 20 has base 55 that may be secured to lower end 40L of mast 40 by various means. Base 55 has a flange 56 with a plurality of thru holes 58 configured to allow a plurality of fasteners 59, such as screws, bolts, and so forth, to secure flange 56, and thus docking device 20, directly to dock surface 23. Note that mast 40 can be configured to extend through surface 23 of dock 22 and/or can at least contact body of water 25.

Figure 5C:
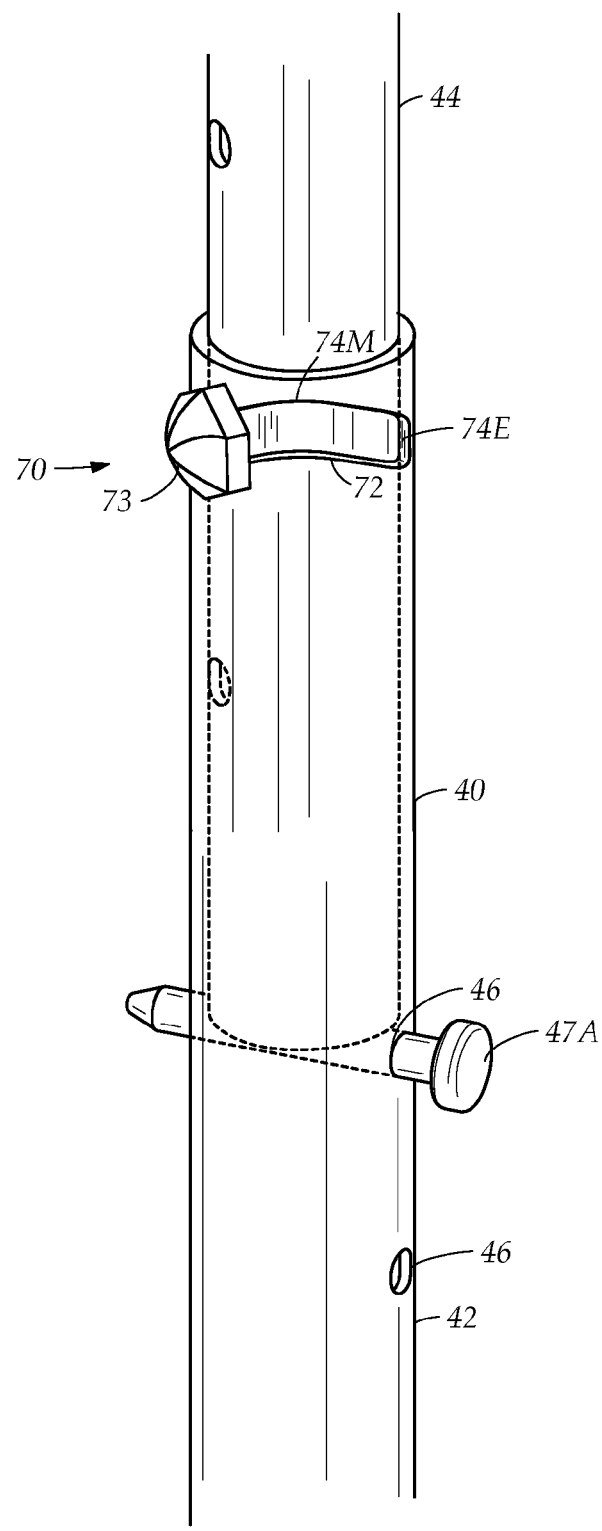
FIG. 5C shows a perspective view of an example embodiment of a mechanism for height adjustment of an arm of a boat-docking device according to the present disclosure.
Figure 5D:
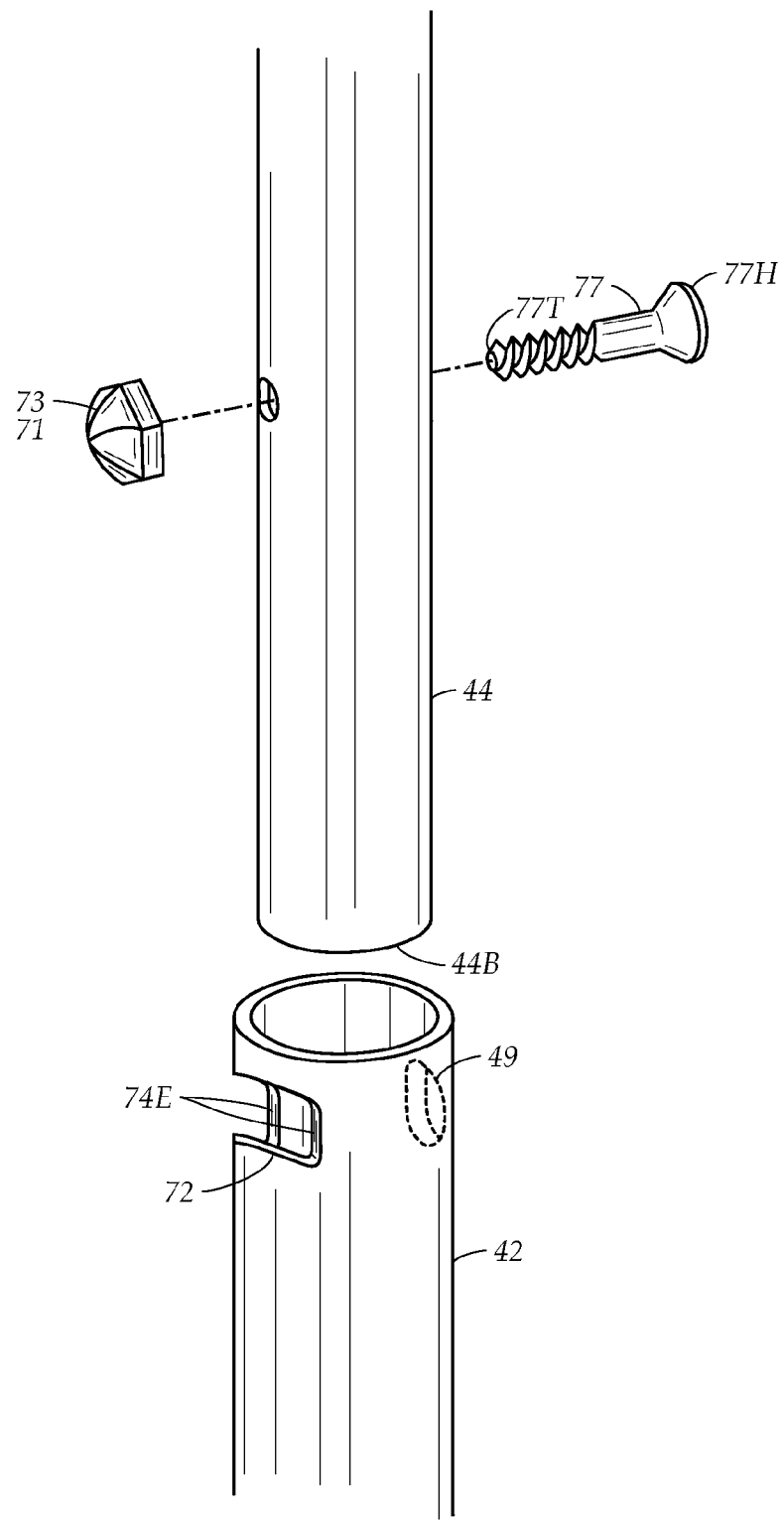
FIG. 5D shows a perspective view of an example embodiment of a pivoting mechanism of a boat-docking device according to the present disclosure.

FIGS. 5A and 5B show a perspective of an example embodiment of a boat-docking device in alternate pivotal positions according to the present disclosure. FIG. 5C shows a perspective view of an example embodiment of a mechanism for height adjustment of an arm of a boat-docking device according to the present disclosure. FIG. 5D shows a perspective view of an example embodiment of a pivoting mechanism of a boat-docking device according to the present disclosure. FIG. 6 shows a perspective view of an example embodiment an arm of a boat-docking device having a clip arrangement according to the present disclosure. FIG. 7 shows a side view of an example embodiment of a boat-docking device holding a pair of lines according to the present disclosure. Some elements of these figures are described above. Thus, same and/or similar reference characters identify identical and/or like components described above and any repetitive detailed description thereof will hereinafter be omitted or simplified in order to avoid complication.

In order to make boat docking device 20 adaptable for different size vessels and/or different types of vessels, boat docking device 20 is configured for pivoting between an extended position, wherein arm 50 is substantially perpendicular to dock edge 24 and/or surface 23, and a retracted position, wherein arm 50 is substantially parallel to dock edge 24 and/or surface 23, which can be via overlying surface 23. Accordingly, FIGS. 5A, 5B, 5C, and 5D, show an example mechanism to allow such pivoting within a ninety-degree field of motion, as well as for height adjustment, to position arm 50 at a desirable height.

Mast 40 comprises of at least two telescoping tubes configured to facilitate easy height adjustment, and pivotal adjustment of arm 50. Mast 40 includes a lower tube 42, and an upper tube 44 in a telescoping relationship with each other. Lower tube 42 includes lower end 40L of mast 40, and is secured to base 55. Upper tube 44 includes upper end 40U of mast 40, which is secured directly or indirectly to arm 50.

For height adjustment, lower tube 42 and upper tube 44 have a plurality of adjustment holes 46 and pins 47, which may be configured in numerous ways to allow relative longitudinal adjustment of tubes 42, 44 at least with respect to each other. Upper tube 44 has an upper tube bottom 44B, a main pin 47A extends through one of adjustment holes 46 in lower tube 42, and upper tube 44 rests upon main pin 47A based on upper tube bottom 44B. Accordingly, main pin 47A provides support for a weight of upper tube 44 and arm 50 via upper tube bottom 44B, but does not actually fix a vertical position of upper tube 44.

A relative position of upper tube 44 with respect to lower tube 42 is a function of a pivoting mechanism 70, which includes a slot 72 in tube 42, and a projection 73 from upper tube 44 that extends through slot 72 such that an axial rotation of upper tube 44 within lower tube 42 is governed by a position of projection 73 within slot 72. Projection 73 can include a handle. Slot 72 is substantially horizontally oriented and has a pair of slot ends 74E. Slot 72 is arched upwardly, toward arm 50, and having a midpoint 74M, which defines an apex of slot 72. Therefore, a shape of slot 72 thereby creates a movement pattern wherein some effort and energy can be required to move projection 73 from one of ends 74E in an uphill direction toward midpoint 74M (overcoming a weight of arm 50 and upper tube 44), and once past midpoint 74M, such energy is returned by way of seemingly "automatic" movement of projection 73 onward to another of slot ends 74E. Such configuration allows arm 50 to rest in either an extended or retracted position, effectively resistant to undesired movement of arm 50 resulting from wind conditions, yet allowing easy deliberate movement of arm 50 by boater 100 to bring arm 50 into an opposite position, where arm 50 automatically locks in place.

Projection 73 is an acorn nut 71, which is secured to a bolt 77 that extends fully through upper tube 44. Bolt 77 has a threaded portion 77T and a bolt head 77H. In order to suitably position upper tube 44 at a desired height, lower tube 42 has an enlarged hole 49 diametrically opposite from slot 72, so that bolt 77 can be inserted through enlarged hole 49, through adjustment holes 46 in upper tube 44, out through slot 72, whereupon acorn nut 71 is mated with threaded portion 77T of bolt 77.

Figure 9:
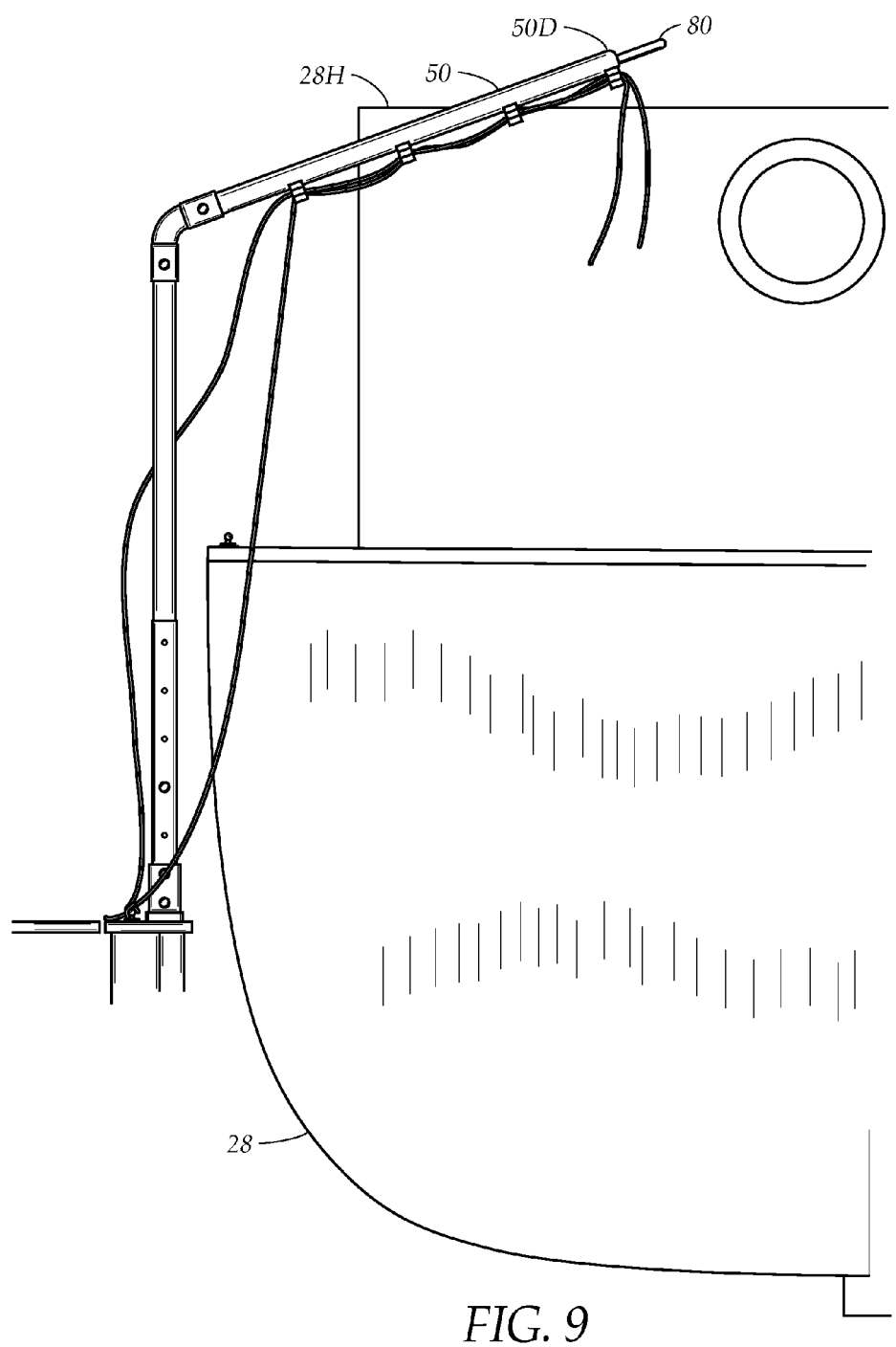
FIG. 9 shows a side view of an example embodiment of a boat-docking device according to the present disclosure.
Figure 10:
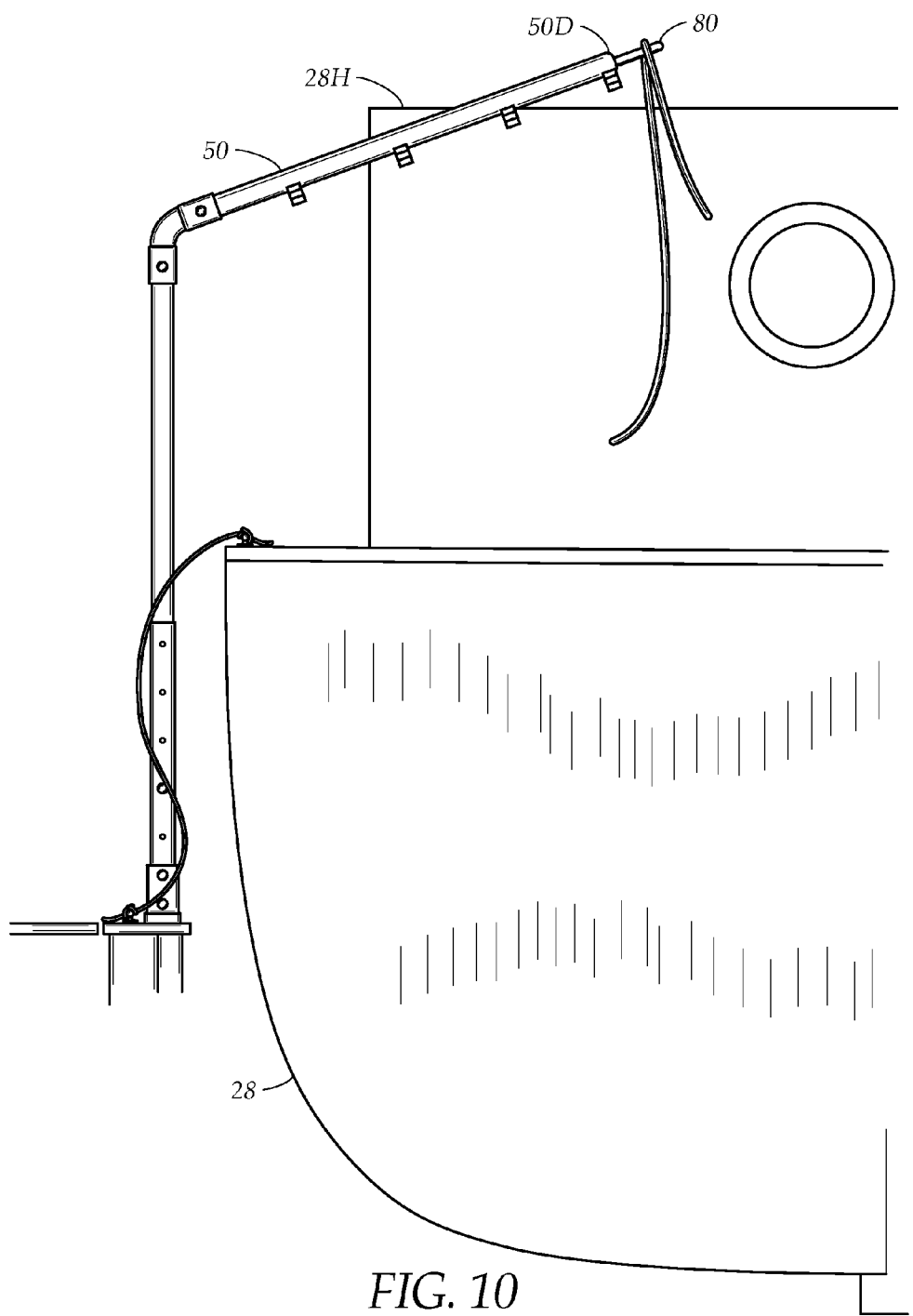
FIG. 10 shows a side view of an example embodiment of a boat-docking device having a tether threaded through an extension adaptation of the device according to the present disclosure.
Figure 11A:
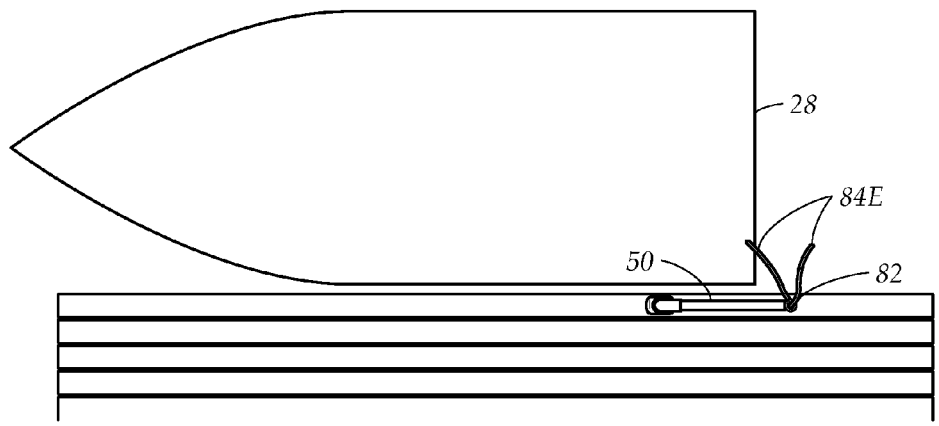
FIG. 11A shows a top plan view of an example embodiment of an arm of a boat-docking device in a retracted position according to the present disclosure.
Figure 11B:
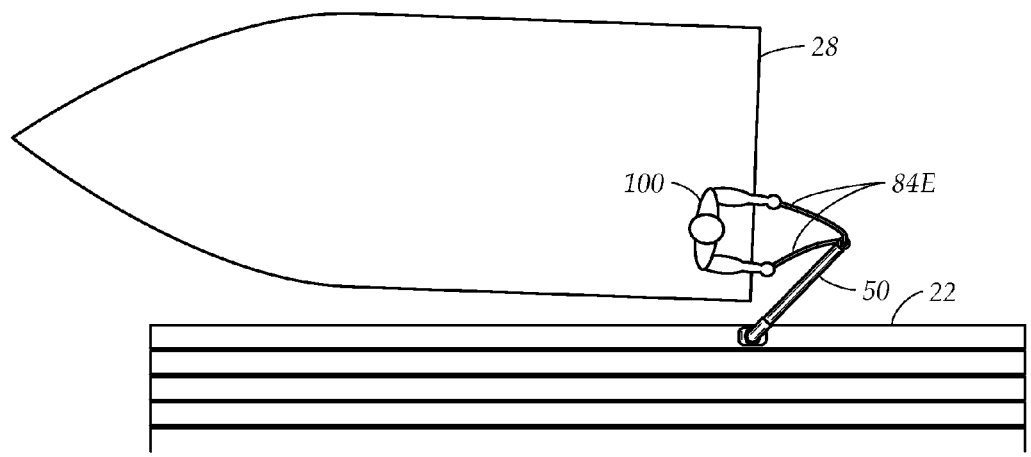
FIG. 11B shows a top plan view of an example embodiment of an arm of a boat-docking device urged into an extending position via a tether according to the present disclosure.
Figure 11C:
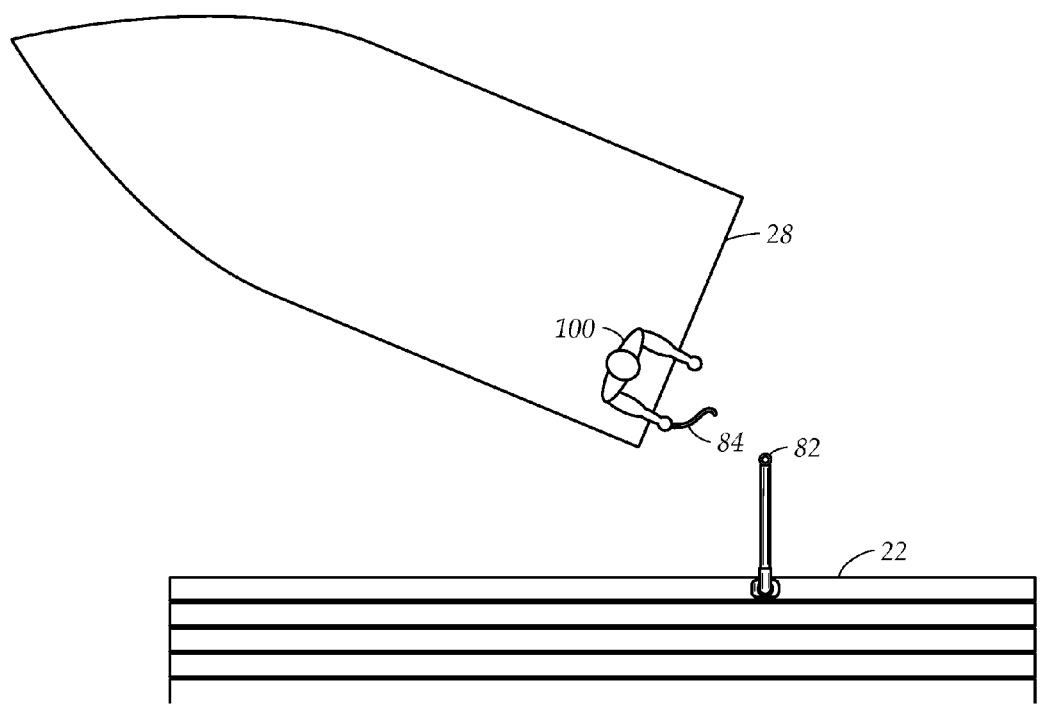
FIG. 11C shows a top plan view of an example embodiment of an arm fully pulled into an extended position according to the present disclosure.

FIG. 8 shows a side view of an example embodiment of an extension adaptation on an arm of a boat-docking device according to the present disclosure. FIG. 9 shows a side view of an example embodiment of a boat-docking device according to the present disclosure. FIG. 10 shows a side view of an example embodiment of a boat-docking device having a tether threaded through an extension adaptation of the device according to the present disclosure. FIG. 11A shows a top plan view of an example embodiment of an arm of a boat-docking device in a retracted position according to the present disclosure. FIG. 11B shows a top plan view of an example embodiment of an arm of a boat-docking device urged into an extending position via a tether according to the present disclosure. FIG. 11C shows a top plan view of an example embodiment of an arm fully pulled into an extended position according to the present disclosure. Some elements of these figures are described above. Thus, same and/or similar reference characters identify identical and/or like components described above and any repetitive detailed description thereof will hereinafter be omitted or simplified in order to avoid complication.

In order to assist boater 100 in pivoting arm 50 into the extended position as boat 28 leaves dock 22, docking device 20 includes an extension adaptation 80 at distal end 50D of arm 50. More particularly, FIGS. 9 and 10 illustrate boat 28 having a higher portion 28H that would interfere with arm 50 as boat 28 moves along dock 22. In such circumstances, arm 50 should be retracted to be parallel substantially to dock 22, while boat 28 is extending along dock edge 24, and then deployed into the extended position only after boat 28 leaves dock 22.

Referring back to FIG. 8, extension adaptation 80 may include a closed loop 82, such as an eyelet, and a tether 84. Tether 84 has a pair of ends 84E. Prior to leaving dock 22, boater 100 extends one of ends 84E through closed loop 82, for example, until ends 84E are equidistant substantially from closed loop 82 (illustrated in FIGS. 11A and 10). Boater 100 then grasps both ends 84E as boat 28 leaves dock 22, pulling arm 50 using tether 84 into the extended position (illustrated in FIG. 11B). Once arm 50 is suitably positioned, boater 100 releases one of ends 84E for flowing fully through and free of closed loop 82, leaving boater 100 holding tether 84 as boat 28 pulls clear of dock 22 (illustrated in FIG. 11C).

Figure 12:
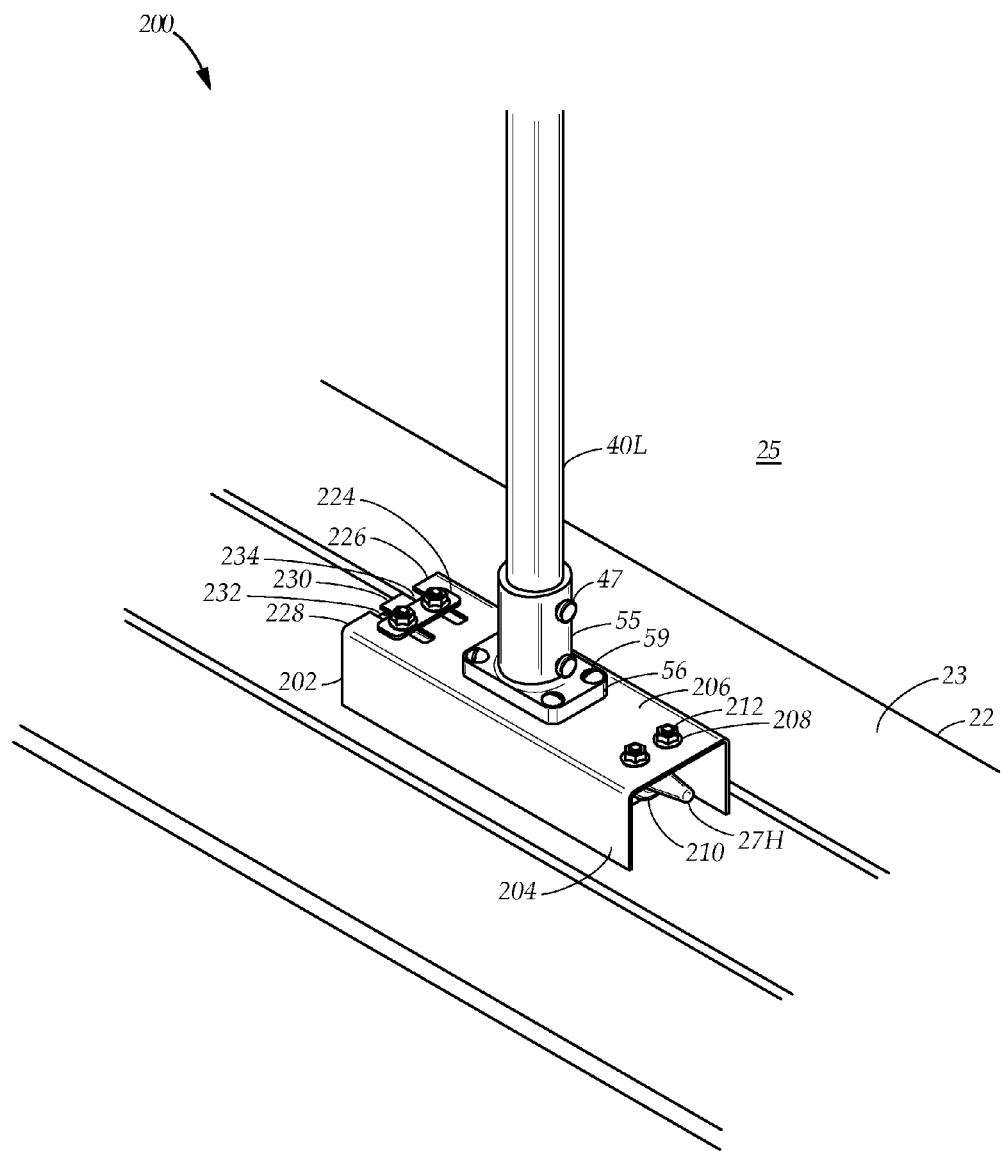
FIG. 12 shows a perspective view of an example embodiment of a cleat clamp coupled to a boat-docking device according to the present disclosure.
Figure 13:
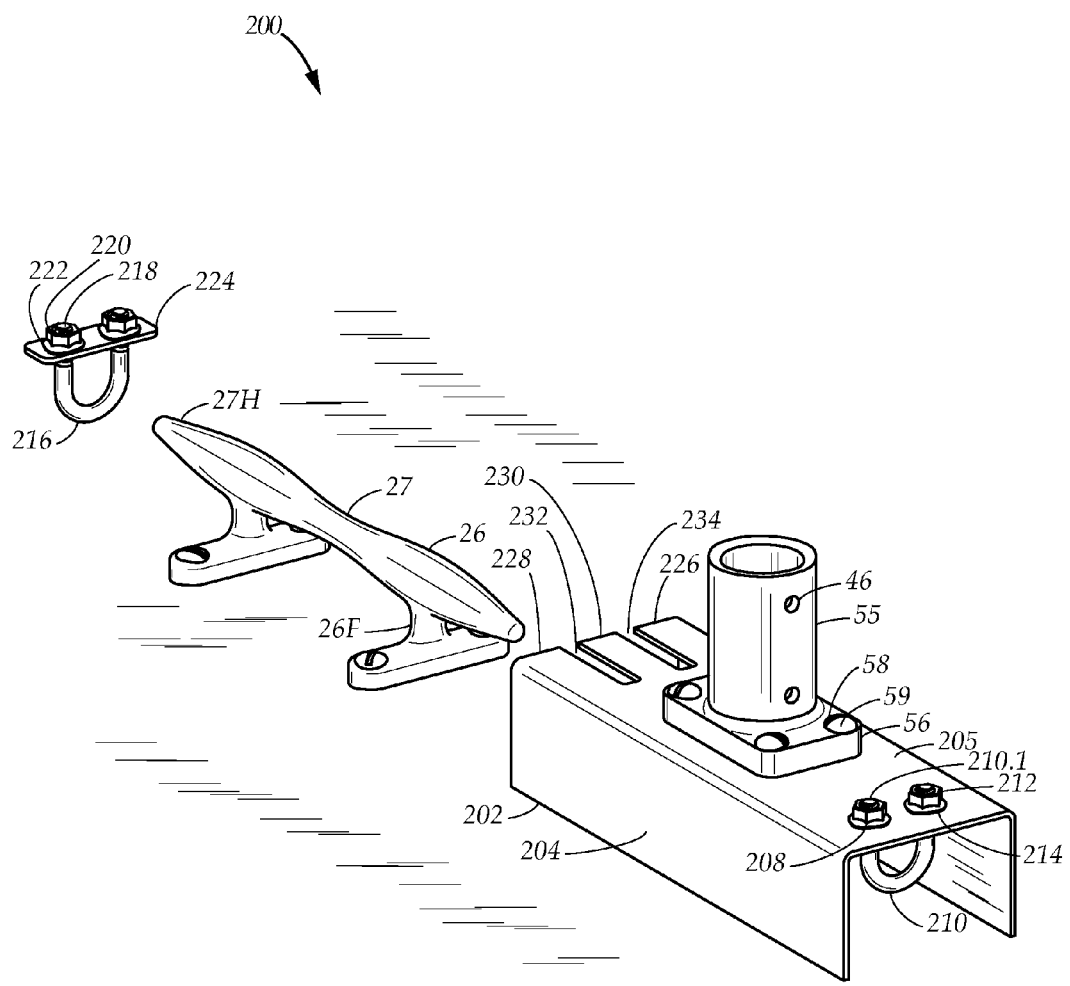
FIG. 13 shows an exploded view of an example embodiment of a cleat clamp according to the present disclosure.
Figure 14:
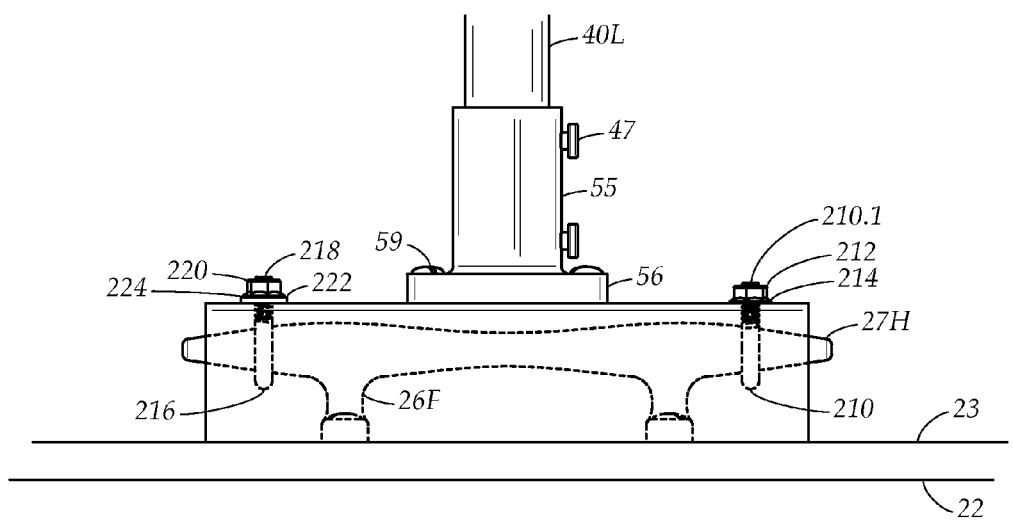
FIG. 14 shows a side view of an example embodiment of a cleat clamp coupled to a boat-docking device according to the present disclosure.

FIG. 12 shows a perspective view of an example embodiment of a cleat clamp coupled to a boat-docking device according to the present disclosure. FIG. 13 shows an exploded view of an example embodiment of a cleat clamp according to the present disclosure. FIG. 14 shows a side view of an example embodiment of a cleat clamp coupled to a boat-docking device according to the present disclosure. Some elements of these figures are described above. Thus, same and/or similar reference characters identify identical and/or like components described above and any repetitive detailed description thereof will hereinafter be omitted or simplified in order to avoid complication.

A cleat clamp 200 includes a clamp body 202, a first cleat-engaging element 210 and a second cleat-engaging element 216. Note that body 202 can also be configured for clamping via only one cleat-engaging element or more than two cleat-engaging elements. Clamp 200 is used for clamping boat docking device 20 to dock cleat 26 on dock surface 23 of dock 22. However, note that clamp 200 can be used for or configured for clamping other devices, systems, and so forth to cleat 26, whether related to marine vessels or some other technical field. Further, other types of cleat clamps can be used as well.

Body 202 can include, whether partially or fully, metal, plastic, glass, rubber, and so forth. Body 202 can include a visual design, a symbol, an identifier, an alphanumeric character and so forth thereon. Body 202 can be weatherproof, rustproof, marine air proof, and so forth.

Body 202 is U-shaped or U-channel shaped as defined via a base 206 and a pair of opposing walls 204 extending from base 206. Note that more than two walls 206 are possible, such as in an E-configuration, which can include the U-shape. Further note that body 202 can also be V-shaped, which can include the U-shape. Base 206 can be ruggedly, roughly or smoothly surfaced, whether internally and/or externally. Base 206 can be perforated. Base 206 can be outwardly arched away from dock surface 23. Base 206 can be linear, wavy, and so forth. Base 206 can include an acute or a rounded corner. Base 206 can be inclined between walls 204. Base 206 includes a pair of opposing ends, such as a first end and a second end. Note that although body 202 is extends linearly along dock surface 23, body 202 can also extend in a curving manner along dock surface 23. For example, body 202 can extend in J-manner or L-manner. Also, body 202 can be closed or closable near at least one end.

Proximal to the first end, base 206 includes a pair of openings 208 extending fully through base 206. Openings 208 can be of any shape, size, and so forth. Openings 208 can be identical to or different from each other in any way. At least one of openings 208 can be threaded. Openings 208 are proximal to each other. In another example embodiment, only base 206 includes only one opening 208.

The second end is E-shaped as defined via a first projection 226, a second projection 228, a third projection 230, a first bay 234 positioned between projection 226 and projection 230, and a second bay 232 positioned between projection 230 and projection 228. Note that projections 226, 230, 228 can be identical to or different from each other in size, material, surface texture and so forth. Bays 234, 232 can be identical to or different from each other in size, area, and so forth. Note that the second end can also be U-shaped, V-shaped, C-shaped, W-shaped, M-shaped, F-shaped, H-shaped, Y-shaped, whether with a serif or without a serif. Note that in another example embodiment, the second end could be non-E-shaped, such as the first end. In another example embodiment, the first end and the second end are E-shaped.

At least one of projections 226, 230, 228 can be perforated. At least one of projections 226, 230, 228 can be outwardly arched away from dock surface 23. At least one of projections 226, 230, 228 can be linear, wavy, and so forth. At least one of projections 226, 230, 228 can include an acute or a rounded corner. At least one of projections 226, 230, 228 can be inclined between walls 204.

Walls 204 can be ruggedly, roughly or smoothly surfaced, whether internally and/or externally. Walls 204 can be perforated. Walls 204 can be outwardly arched away from dock surface 23. Walls 204 can be linear, wavy, and so forth. Walls 204 can include an acute or a rounded corner. Note that walls 204 can be identical to or different from each other in size, area, material, surface texture, and so forth. Also, note that at least one of walls 204 can include a leg, whether being a part of at least one of walls 204, such as via extending, or coupled to at least one of walls 204, for contacting dock surface 23, while supporting at least one of walls 204.

Base 206 include base 55 thereon. Base 55 is coupled to lower end 40L of mast 40 via various means. For example, base 55 has holes 46 operative to receive pins 47 for extending through base 55. Flange 56 is coupled to base 55. Flange 56 can be of any shape, such as an ellipse, a quadrilateral, a parallelogram, and so forth. Flange 56 includes openings 58 through which fasteners 59 fasten flange 56 to dock surface 23. Note that flange 56 and base 55 can be configured to be fixed with respect to each other or flange 56 and base 55 can be configured such that base 55 rotates/pivots/turns with respect to flange 56 coupled to dock surface 23, such as via having a range of motion of about 180 degrees. Note that mast 40 can be configured to extend through surface 23 of dock 22 and/or can at least contact body of water 25. Also, note that at least one of pins 47 can function as a set screw and apply tension/resistance against wind so that lower end 40L avoids at least one of falling and rotating. Further, note that at least one of pins 47 can avoid fully extending through base 55.

Note that other ways of coupling mast 40 to clamp 200 can also be used, such as male-female mating, snapping, fastening, and so forth.

First cleat engaging element 210 is configured to at least partially extend around horn 27H of dock cleat 26 such that element 210 can at least partially grasp horn 27H. Element 210 can include, whether partially or fully, metal, plastic, glass, rubber, and so forth. Element 210 can be a bolt. Element 210 is U-shaped. However, note that element 210 can be A-shaped, C-shaped, E-shaped, F-shaped, G-shaped, H-shaped, J-shaped, K-shaped, L-shaped, M-shaped, N-shaped, O-shaped, P-shaped, Q-shaped, R-shaped, S-shaped, T-shaped, V-shaped, W-shaped, X-shaped, Y-shaped, whether with a serif or without a serif. For example, element 210 can partially extend around horn 27H, such as via the J-shape, element 210 can fully extend around horn 27H, such as via the V-shape, element 210 can receive horn 27H via a hole, such as via the A-shape, and so forth. Also, element 210 can be shaped via a T, as defined via a leg and a pair of arms, and a ring extending from the T-leg.

Element 210 can extend between walls 204 from base 210 without extending fully through base 206 or via extending through base 206 via openings 208. In such scenario, element 210 is fastened to base 206 via a pair of nuts 212 threading with a pair of threads 210.1. Note that nuts 212 can be any type of nut, such as a wing nut, an acorn nut, a coupling nut, a hex nut, and so forth. Further, a washer 214 can be used as well, although washer 214 can also be lacking. Washer 214 can be of any type. Note that in some example embodiments, element 210 could also or alternatively couple to walls 204.

Second cleat engaging element 216 is configured to at least partially extend around horn 27H of dock cleat 26 such that element 216 can at least partially grasp horn 27H. Element 216 can include, whether partially or fully, metal, plastic, glass, rubber, and so forth. Element 216 can be a bolt. Element 216 is U-shaped. However, note that element 216 can be A-shaped, C-shaped, E-shaped, F-shaped, H-shaped, J-shaped, K-shaped, L-shaped, M-shaped, N-shaped, P-shaped, R-shaped, S-shaped, T-shaped, V-shaped, W-shaped, X-shaped, Y-shaped, whether with a serif or without a serif. For example, element 216 can partially extend around horn 27H, such as via the J-shape, element 216 can fully extend around horn 27H, such as via the V-shape, element 216 can receive horn 27H via a hole, such as via the A-shape, and so forth. At least one leg of element 216 is moved into at least one of bay 232, 234 such that element 216 at least partially extends around horn 27H of dock cleat 26 and element 216 can at least partially grasp horn 27H, while element 216 extends between walls 204. Element 216 includes a threaded end 218. Also, element 216 can be shaped via a T, as defined via a leg and a pair of arms, and a ring extending from the T-leg. Note that in some example embodiments, element 216 could also or alternatively couple to walls 204.

A plate 224 is placed over at least one of bays 232, 234. Plate 224 can have any shape, thickness, size, surface, and so forth. For example, plate 224 can be an ellipse, a parallelogram, a quadrilateral, and so forth. Plate 224 can include, whether partially or fully, metal, plastic, glass, rubber, and so forth. Plate 224 includes at least one opening for receiving at least one leg of element 216.

A nut 220 is used to fasten element 216 via plate 224 onto body 202. Nut 220 can be any type of nut, such as a wing nut, an acorn nut, a hex nut, and so forth. A washer 222 can be used as well, although washer 222 can also be lacking. Washer 222 can be of any type. In another example embodiment, plate 224 is lacking and nuts 220 are sized to grasp onto at least two of projections 226, 230, 228 to provide for fastening.

In one mode of operation, a person places clamp 200 over dock cleat 26 such that body 202 extends over both horns 27H. The person then places element 210 under one of horns 27H such that element 210 extends through base 206. The person then fastens element 210 via nuts 212 to body 202 and one of horns 27H such that clamping is performed at the first end. The person then moves element 216 under another one of horns 27H such that element 216 is moved into bays 232, 234. The person then places plate 224 through element 216 onto body 202. The person then fastens element 216 via nuts 220 to body 202 via plate 224 and another one of horns 27H such that clamping is performed at the second end. Therefore, clamp 200 clamps onto dock cleat 26 at both horns 27H and allows mast 40 to remain coupled to dock 22.

Note that although element 210 and element 216 clamp horns 27H with body 27 positioned in between element 210 and element 216, in other example embodiments, at least one of element 210 and element 216 can clamp via body 27 and even via leg 26F, such as when at least one of element 210 and element 216 is L-shaped as defined via a first U-shape portion and a second U-shape portion perpendicularly coupled to each other. In such scenarios, body 202 can extend over one horn 27H and body 27 or just body 27. In still another example embodiment, at least one of element 210 and element 216 can be configured to extend around dock surface 23 and at least one of horns 27H or body 27.

Figure 15:
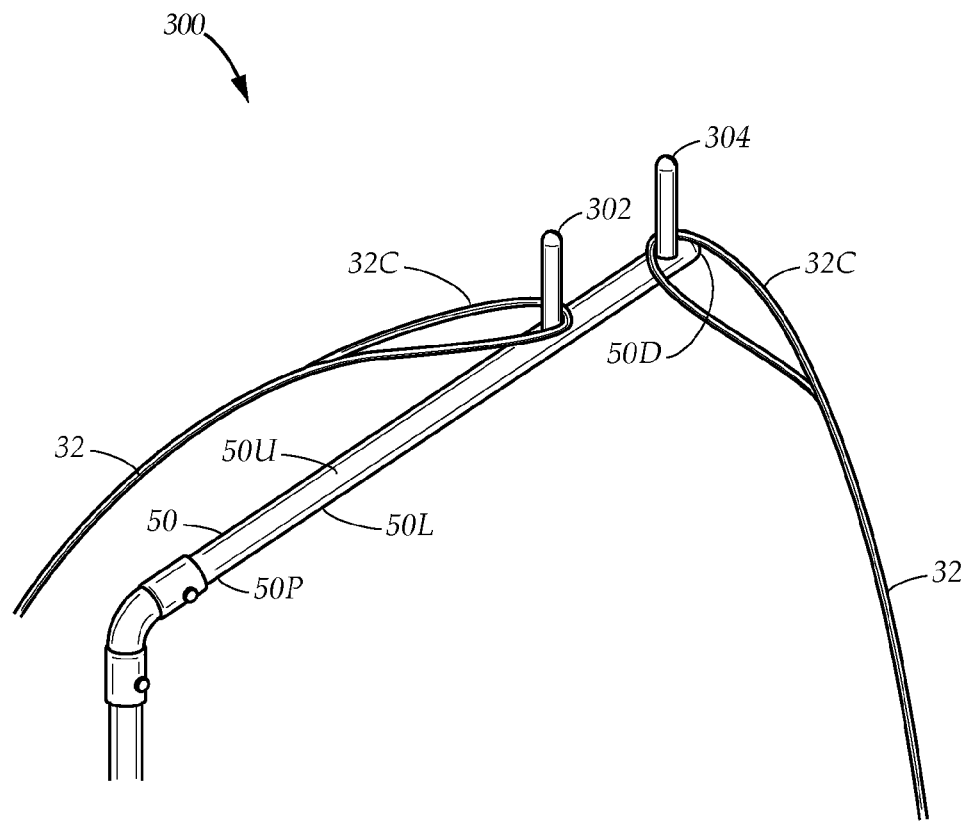
FIG. 15 shows a perspective view of an example embodiment of an arm of a boat-docking device having a line loop holder according to the present disclosure.

FIG. 15 shows a perspective view of an example embodiment of an arm of a boat-docking device having a line loop holder according to the present disclosure. Some elements of this figure are described above. Thus, same and/or similar reference characters identify identical and/or like components described above and any repetitive detailed description thereof will hereinafter be omitted or simplified in order to avoid complication.

A docking rope loop holding system 300 includes arm 50 having proximal end 50 and distal end 50D. Arm 50 includes an upper surface 50U and lower surface 50L. Upper surface 50U includes a peg 302 and a peg 304. Although peg 302 and peg 304 are upright, at least one of peg 302 and peg 304 can be angled with respect to arm 50. Peg 302 and peg 304 are configured to receive docking rope loops 32C from dock lines 32, which are secured to dock 22. Peg 302 and peg 304 can include metal, plastic, glass, rubber, and so forth. For example, the rubber can provide resistance to prevent effectively one of loops 32C from sliding off one of peg 302 and peg 304. Peg 302 and peg 304 can be identical to or different from each other in size, shape, external surface, internal constituency, volume, area, direction, material and so forth. Note that in other example embodiments only one peg can be used, such as either peg 302 or peg 304. Also, note that although peg 302 and peg 304 are linear, peg 302 and peg 304 can also be curved or wavy. Further, note that other loop receiving structures can also be used for receiving docking rope loops, such as J-shape, L-shape, a hook, F-shape, K-shape, and so forth.

In one mode of operation, when docking, a person lifts loop 32C of docking line 32 from shaft 304 and secures to boat 28. Note that shaft 302 and shaft 304 can be used with or without clips 52. Once boat 28 is close enough to dock 22 to allow the person on boat 28 to grab loops 32C ropes off shaft 302 and shaft 304, arm 50 can be pushed away to be parallel to dock 22 and the person on boat 28 can then use lines 32 to pull boat 28 to dock.

Note that although the present disclosure has been described in terms of boat 28, the present disclosure can be used and/or configured for use with any type of marine vessel and/or watercraft, whether manned and/or unmanned, whether propelled via an engine, sails, and/or humans, whether primarily traveling on water surface and/or below water surface, whether for recreational purposes, commercial purposes, military purposes, industrial purposes, travel purposes, research purposes, and so forth. Some examples of such vessels or watercraft include boats, ships, yachts, sailboats, barges, tankers, submarines, catamarans, robotic marine vehicles, hovercraft, water skis, canoes, and so forth. Further, although the present disclosure has been described in terms of dock 22 adjacent to the body of water, such as via extending from a land periphery, the present disclosure can be used and/or configured for use with any type of dock.

The present disclosure has been presented for purposes of example illustration and description. The present disclosure is not intended to be fully exhaustive and/or necessarily limited to only the present disclosure in the form disclosed. Rather, many modifications and variations in techniques and structures are and will be apparent to those of ordinary skill in the art without departing from the scope and spirit of the present disclosure, as set forth in the claims that follow. Accordingly, such modifications and variations are contemplated as being a part of the present disclosure. The scope of the present disclosure is defined by the claims, which includes known equivalents and unforeseeable equivalents at the time of filing of the present disclosure.

What is claimed is:

1. A marine vessel docking system for use with a marine vessel in a body of water, a dock adjacent to said body of water, and a line having a fixed end and a free end, said vessel having an occupant onboard, said dock including a cleat having a first horn and a second horn extending oppositely from each other, said fixed end secured to said dock, said system comprising:

a cleat clamp configured for manual clamping to said cleat;

a mast having a lower end and an upper end, said lower end configured for coupling to said clamp;

an arm having a proximal end, a distal end, and a lower side extending between said proximal end and said distal end, said proximal end configured for coupling to said upper end such that said arm is capable of extending at least substantially perpendicularly therefrom;

a plurality of clips coupled to said side along said side, said clips configured for selectively holding said line such that said line extends between said proximal end and said distal end along said side and said free end is near said distal end, said clips configured for facilitating said line to be grasped by said occupant such that said clips release said line therefrom to said occupant when said vessel is near said arm and said arm extends over said body of water.

2. The system of claim 1, wherein said clamp further comprising a U-shaped body, a first cleat-engaging element, and a second cleat-engaging element, said body defined via a base and a pair of walls extending from said base, said first element and said second element graspingly engage said cleat while coupled to said body when said clamp clamps to said cleat, said walls extend along said cleat with said cleat being between said walls while said cleat is between said base and said dock when said clamp clamps to said cleat.

3. The system of claim 2, wherein said base further comprising a first end and a second end opposing said first end, said second end having a bay defined via a first projection and a second projection, said first element configured for coupling to said base near said first end, said second element within said bay between said first projection and said second projection when said second element is fastened to said body.

4. The system of claim 3, wherein said clamp further comprising a plate configured for spanning said bay between said first projection and said second projection, said second element configured for fastening to said body via said plate, said first element configured for fastening to said body.

5. The system of claim 4, wherein said lower end is configured for coupling to said base such that said base is between said lower end and said cleat, said second end is E-shaped, said first element is U-shaped, said second element is U-shaped, said first element configured for graspingly engaging said cleat via said first horn, said second element configured for graspingly engaging said cleat via said second horn.

6. The system of claim 1, wherein said clamp further comprising a U-shaped body, a first U-fastener, and a second U-fastener, said body defined via a base and a pair of walls extending from said base, said base having a first end and a second end opposing said first end, said second end is E-shaped, said first fastener is configured for fastening to said base near said first end while engaging said first horn, said second fastener is configured for fastening to said second end while engaging said second horn, said walls configured for extending along said cleat such that said cleat is between said walls and said cleat is between said base and said dock, said base configured for coupling to said lower end.

7. The system of claim of claim 6, wherein said clamp further comprising a plate configured for coupling to said second fastener when said second fastener engages said second horn.

8. The system of claim 7, wherein at least one of said first fastener and said second fastener is configured for fastening via a wing nut such that said base is between said nut and said cleat.

9. The system of claim 1, wherein said arm includes a line loop holder stationed between said proximal end and said distal end, said holder configured for holding a loop when said free end includes said loop, said holder is positioned such that said loop avoids falling freely off said holder when said holder holds said loop.

10. The system of claim 9, wherein said holder includes a peg extending upwardly from said arm.

11. The system of claim 1, wherein, while secured to said dock, said mast allows said arm to rotate substantially ninety degrees between an extended position that is substantially perpendicular to said dock, and a retracted position that is substantially parallel to said dock.

12. The system of claim 1, wherein said mast is configured for telescopic height adjustment, said mast includes a pivoting device configured for facilitating an axial rotation within a field of substantially ninety degrees to allow movement of said arm between an extended position and a retracted position, said device is configured for locking said arm in said extended position and said retracted position.

13. The system of claim 1, further comprising an extension adaptation positioned at said distal end, said adaption is configured for receiving a tether such that said arm can be pulled toward an extended position by said occupant as said vessel leaves said dock.

14. A marine vessel docking system for use with a marine vessel in a body of water, a dock adjacent to said body of water, and a line having a fixed end and a free end, said vessel having an occupant onboard, said dock having a dock surface with a cleat equipped with a pair of feet coupled to said dock surface, said cleat having a main body with a first horn and a second horn extending from said main body oppositely from each other outwardly of said feet, said fixed end secured to said dock, said system comprising:

a base having a base block, said block having a front face, a rear face, and a bottom surface, said block having a pair of wedges extending from said rear face near said bottom surface, said wedges having a space therebetween such that said wedges can extend snugly beneath said first horn and said second horn with said feet extending between said wedges;

a strap having a pair of strap ends, said strap configured for extending around said front face of said block;

an arm coupled to said block such that said arm can extend outwardly over said body of water for holding said free end in a position where said free end can be reached by said occupant before said vessel reaches said dock when said block is secured to said cleat, said arm having a proximal end and a distal end;

a line loop holder stationed on said arm between said proximal end and said distal end, said holder configured for holding a loop when said free end includes said loop, said holder is positioned such that said loop avoids falling freely off said holder when said holder holds said loop.

15. The system of claim 14, further comprising a mast coupled to said base and said arm, said holder includes a peg extending upwardly from said arm.

16. The system of claim 14, wherein said block has a plurality of side faces extending between said front face and said rear face, said block further comprising a plurality of strap guides on at least one of said side faces and said front face, said strap configured for selectively extending through said guides to effectively prevent movement of said block when said block is secured to said cleat with said strap.

17. The system of claim 14, wherein said arm including a lower side extending between said proximal end and said distal end, said arm including a plurality of clips coupled to said side along said side, said clips configured for selectively holding said line and for facilitating said line to be grasped by said occupant such that said clips release said line therefrom to said occupant when said vessel is near said arm and said arm extends over said body of water.

18. A marine vessel docking system for use with a marine vessel in a body of water, a dock adjacent to said body of water, and a line having a fixed end and a free end, said vessel having an occupant onboard, said dock including a cleat having a first horn and a second horn extending oppositely from each other, said fixed end secured to said dock, said system comprising:

a cleat clamp including a U-shaped body, a first U-fastener, and a second U-fastener, said body defined via a base and a pair of walls extending from said base, said base having a first end and a second end opposing said first end, said second end is E-shaped, said first fastener configured for fastening to said base near said first end while grasping said first horn, said second fastener configured for fastening to said second end while grasping said second horn, said walls configured for extending along said cleat such that said cleat is between said walls while being between said base and said dock;

a mast having a lower end and an upper end, said lower end configured for coupling to said base such that said base is between said lower end and said cleat;

an arm having a proximal end, a distal end, and a lower side extending between said proximal end and said distal end, said proximal end configured for coupling to said upper end such that said arm is capable of extending at least substantially perpendicularly therefrom;

a peg stationed on said arm between said proximal end and said distal end, said peg configured for holding a loop when said free end includes said loop, said peg is positioned such that said loop avoids falling freely off said peg when said peg holds said loop.

19. The system of claim 18, further comprising at least one of:
- a plate configured for coupling to said second fastener when said second fastener grasps said second horn, said plate configured for positioning such that said second end is between said plate and said dock when coupled to said second fastener;
- an extension adaptation positioned at said distal end, said adaption configured for receiving a tether such that said arm can be pulled toward an extended position by said occupant as said vessel leaves said dock;
- a pivoting device coupled to said mast, said device configured for facilitating an axial rotation within a field of substantially ninety degrees to allow movement of said arm between an extended position and a retracted position, said device configured for locking said arm in said extended position and said retracted position;
- a plurality of clips coupled to said side along said side, said clips configured for selectively holding said line and for facilitating said line to be grasped by said occupant such that said clips release said line therefrom to said occupant when said vessel is near said arm and said arm extends over said body of water.

* * * * *